United States Patent
Hsu et al.

(10) Patent No.: US 9,729,890 B2
(45) Date of Patent: Aug. 8, 2017

(54) METHOD AND APPARATUS FOR UNIFICATION OF SIGNIFICANCE MAP CONTEXT SELECTION

(71) Applicant: HFI Innovation Inc., Zhubei, Hsinchu County (TW)

(72) Inventors: Chih-Wei Hsu, Taipei (TW); Tzu-Der Chuang, Hsinchu County (TW); Yu-Wen Huang, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 424 days.

(21) Appl. No.: 14/371,404

(22) PCT Filed: Nov. 16, 2012

(86) PCT No.: PCT/CN2012/084732
§ 371 (c)(1),
(2) Date: Jul. 9, 2014

(87) PCT Pub. No.: WO2013/104210
PCT Pub. Date: Jul. 18, 2013

(65) Prior Publication Data
US 2015/0010055 A1     Jan. 8, 2015

Related U.S. Application Data

(60) Provisional application No. 61/585,826, filed on Jan. 12, 2012.

(51) Int. Cl.
*H04N 19/196* (2014.01)
*H04N 19/13* (2014.01)
(Continued)

(52) U.S. Cl.
CPC ............ *H04N 19/196* (2014.11); *H04N 19/13* (2014.11); *H04N 19/18* (2014.11); *H04N 19/463* (2014.11); *H04N 19/91* (2014.11)

(58) Field of Classification Search
CPC .................. H04N 19/00121; H04N 19/196
See application file for complete search history.

(56) References Cited

U.S. PATENT DOCUMENTS

| 7,702,013 B2 | 4/2010 | Schwarz et al. |
| 2005/0123207 A1 | 6/2005 | Marpe et al. |

(Continued)

FOREIGN PATENT DOCUMENTS

| CN | 1210429 A | 3/1999 |
| CN | 101077012 A | 11/2007 |

(Continued)

OTHER PUBLICATIONS

Hsu, C.W., et al.; "Non-CE11 Unification of Transform Coefficient Coding;" Joint Collaborative Team on Video Coding (JCT-VC) of ITU-T SG16 WP3 and ISO/IEC JTC1/SC29/WG11; Feb. 2012; pp. 1-8.

(Continued)

*Primary Examiner* — Tung Vo
*Assistant Examiner* — Rowina Cattungal
(74) *Attorney, Agent, or Firm* — McClure, Qualey & Rodack, LLP

(57) ABSTRACT

A method and apparatus for significance map coding for 4×4 TUs (transform units) and 8×8 TUs of video data are disclosed. The method comprises receiving at least one context selection table for a first TU associated with a first color component and generating a derived context selection table for a second TU associated with a second color component from said at least one context selection table. The first TU has a first size comprising of 4×4 and 8×8. The second TU has a second size comprising of 4×4 and 8×8. The second size is different from the first size, the second color component is different from the first color component, or both the second size is different from the first size and the second color component is different from the first color component. The derived context selection table is then used for significance map processing of the second TU.

23 Claims, 8 Drawing Sheets

(51) Int. Cl.
  *H04N 19/463* (2014.01)
  *H04N 19/91* (2014.01)
  *H04N 19/18* (2014.01)

(56) References Cited

U.S. PATENT DOCUMENTS

| | | | |
|---|---|---|---|
| 2008/0130988 A1 | 6/2008 | Moriya et al. | |
| 2008/0219578 A1* | 9/2008 | Lee | H04N 19/13 382/247 |
| 2008/0267513 A1* | 10/2008 | Sankaran | H03M 7/4006 382/232 |
| 2009/0123066 A1 | 5/2009 | Moriya et al. | |
| 2012/0106649 A1* | 5/2012 | Wang | H04N 19/159 375/240.18 |
| 2012/0140815 A1* | 6/2012 | Zhou | H04N 19/117 375/240.03 |
| 2013/0107969 A1* | 5/2013 | Nguyen | H04N 19/70 375/240.18 |

FOREIGN PATENT DOCUMENTS

| | | |
|---|---|---|
| CN | 101218830 | 7/2008 |
| WO | 2008108534 A1 | 9/2008 |
| WO | WO 2011/142817 | 11/2011 |

OTHER PUBLICATIONS

Auyeung, C., et al.; "Non-CE11 Context Reduction of Significance Map Coding;" Joint Collaborative Team on Video Coding (JCT-VC) of ITU-T SG16 WP3 and ISO/IEC JTC1/SC29/WG11; Nov. 2011; pp. 1-9.

Korodi, G., et al.; "Encoding and Decoding Significant Coefficient Flags for Small Transform Units using Partition Sets;" Joint Collaborative Team on Video Coding (JCT-VC) of ITU-T SG16 WP3 and ISO/IEC JTC1/SC29/WG11; Nov. 2011; pp. 1-14.

Bross, B., et al.; "High Efficiency Video Coding (HEVC) Text Specification;" Joint Collaborative Team on Video Coding (JCT-VC) of ITU-T SG16 WP3 and ISO/IEC JTC1/SC29/WG11; Nov. 2011; pp. 1-215.

Sze, V., et al.; "Description of Core Experiment 11 (CeI1 ) Coefficient Scanning and Coding;" Joint Collaborative Team on Video Coding (JCT-VC) of ITU-T SG16 WP3 and ISO/IEC JTC1/SC29/WG11; Nov. 2011; pp. 1-6.

Sze, V., et al.; Reduction in Contexts used for Significant_Coeff_Flag and Coefficient Level; Joint Collaborative Team on Video Coding (JCT-VC) of ITU-T SG16 WP3 and ISO/IEC JTC1/SC29/WG11; Jul. 2011; pp. 1-4.

Sole, J., et al.; "CE6.c Harmonization of HE Residual Coding with Non-Square Block Transforms;" Joint Collaborative Team on Video Coding (JCT-VC) of ITU-T SG16 WP3 and ISO/IEC JTC1/SC29/WG11; Nov. 2011; pp. 1-6.

Tsukuba, T., et al; Non-CE11 Context Reduction of Significance Map Coding with CABAC; Joint Collaborative Team on Video Coding (JCT-VC) of ITU-T SG16 WP3 and ISO/IEC JTC1/SC29/WG11; Feb. 2012; pp. 1-8.

Hsiang, S.T., et al.; "Context Reduction for Coding Transform Coefficients;" Joint Collaborative Team on Video Coding (JCT-VC) of ITU-T SG16 WP3 and ISO/IEC JTC1/SC29/WG11; Nov. 2011; pp. 1-7.

Sze, V.; "Simplified Coefficient Scans for NSQT;" Joint Collaborative Team on Video Coding (JCT-VC) of ITU-T SG16 WP3 and ISO/IEC JTC1/SC29/WG11; Nov. 2011; pp. 1-8.

Sze, V., et al.;"On significance map coding for CABAC;" Joint Collaborative Team on Video Coding (JCT-VC) of ITU-T SG16 WP3 and ISO/IEC JTC1/SC29/WG11; Nov. 2011; pp. 1-5.

* cited by examiner

| 0 | 1 | 4 | 5 |
|---|---|---|---|
| 2 | 3 | 4 | 5 |
| 6 | 6 | 8 | 8 |
| 7 | 7 | 8 |   |

310

| 0 | 1 | 2 | 4 |
|---|---|---|---|
| 1 | 1 | 2 | 4 |
| 3 | 3 | 5 | 5 |
| 4 | 4 | 5 |   |

| 15* | 0 | 1 | 1 | 2 | 2 | 3 | 3 |
|---|---|---|---|---|---|---|---|
| 0 | 0 | 1 | 1 | 2 | 2 | 3 | 3 |
| 4 | 4 | 5 | 5 | 10 | 10 | 3 | 3 |
| 4 | 4 | 5 | 5 | 10 | 10 | 3 | 3 |
| 8 | 8 | 10 | 10 | 10 | 10 | 11 | 11 |
| 8 | 8 | 10 | 10 | 10 | 10 | 11 | 11 |
| 12 | 12 | 12 | 12 | 11 | 11 | 11 | 11 |
| 12 | 12 | 12 | 12 | 11 | 11 | 11 |   |

Fig. 4

| 0 | 0 | 1 | 1 | 2 | 2 | 6 | 6 |
|---|---|---|---|---|---|---|---|
| 0 | 0 | 1 | 1 | 2 | 2 | 6 | 6 |
| 3 | 3 | 4 | 4 | 7 | 7 | 6 | 6 |
| 3 | 3 | 4 | 4 | 7 | 7 | 6 | 6 |
| 5 | 5 | 7 | 7 | 7 | 7 | 9 | 9 |
| 5 | 5 | 7 | 7 | 7 | 7 | 9 | 9 |
| 8 | 8 | 8 | 8 | 9 | 9 | 9 | 9 |
| 8 | 8 | 8 | 8 | 9 | 9 | 9 | 9 |

Fig. 8B

METHOD AND APPARATUS FOR UNIFICATION OF SIGNIFICANCE MAP CONTEXT SELECTION

CROSS REFERENCE TO RELATED APPLICATIONS

The present invention claims priority to U.S. Provisional Patent Application, Ser. No. 61/585,826, filed on Jan. 12, 2012, entitled "Unification of significance map context selection for 4×4 and 8×8 TUs". The U.S. Provisional Patent Application is hereby incorporated by reference in its entirety.

TECHNICAL FIELD

The present invention relates to video coding or video processing. In particular, the present invention relates to significance map context selection for 4×4 and 8×8 transform units.

BACKGROUND

The arithmetic coding is known as an efficient data compressing method and is widely used in coding standards, such as JBIG, JPEG2000, H.264/AVC, and High-Efficiency Video Coding (HEVC). In H.264/AVC JVT Test Model (JM) and HEVC Test Model (HM), Context-Based Adaptive Binary Arithmetic Coding (CABAC) is adopted as the entropy coding tool for various syntax elements in the video coding system.

FIG. 1 illustrates an example of CABAC encoder 100 which includes three parts: Binarization 110, Context Modeling 120, and Binary Arithmetic Coding (BAC) 130. In the binarization step, each syntax element is uniquely mapped into a binary string (also called bin or bins in this disclosure). In the context modeling step, a probability model is selected for each bin. The corresponding probability model may depend on previously encoded syntax elements, bin indexes, side information, or any combination of the above. After the binarization and the context model assignment, a bin value along with its associated context model is provided to the binary arithmetic coding engine, i.e., the BAC 130 block in FIG. 1. The bin value can be coded in two coding modes depending on the syntax element and bin indexes, where one is the regular coding mode, and the other is the bypass mode. The bins corresponding to regular coding mode are referred to as regular bins and the bins corresponding to bypass coding mode are referred to as bypass bins in this disclosure. In the regular coding mode, the probability of the Most Probable Symbol (MPS) and the probability of the Least Probable Symbol (LPS) for BAC are derived from the associated context model. In the bypass coding mode, the probability of the MPS and the LPS are equal. In CABAC, the bypass mode is introduced to speed up the encoding process.

High-Efficiency Video Coding (HEVC) is a new international video coding standard that is being developed by the Joint Collaborative Team on Video Coding (JCT-VC). HEVC is based on the hybrid block-based motion-compensated DCT-like transform coding architecture. The basic unit for compression, termed Coding Unit (CU), is a 2N×2N square block, and each CU can be recursively split into four smaller CUs until a predefined minimum size is reached. Each CU contains one or several variable-block-sized Prediction Unit(s) (PUs) and Transform Unit(s) (TUs). For each PU, either intra-picture or inter-picture prediction is selected. Each TU is processed by a spatial block transformation and the transform coefficients for the TU are then quantized. The smallest TU size allowed for HEVC is 4×4.

In HEVC Test Model Version 5.0 (HM-5.0), the transform coefficients are coded TU by TU. For each TU, syntax elements last_significant_coeff_x and last_significant_coeff_y are transmitted to indicate the last non-zero coefficient horizontal and vertical positions respectively according to a selected scanning order. A TU is divided into multiple subsets for the TUs having size larger than 4×4. For an 8×8 TU, the 64 coefficients are divided into 4 subsets according to the diagonal scanning order through the entire 8×8 TU as shown in FIG. 2. The scanning through the transform coefficients will convert the two-dimensional data into a one-dimensional data. Each subset contains 16 continuous coefficients of the diagonally scanned coefficients. For TUs having size larger than 8×8 (e.g. 16×16, 32×32) and non-square TUs (e.g. 16×4, 4×16, 32×8, 8×32), the TUs are divided into 4×4 sub-blocks. Each sub-block corresponds to a coefficient sub-set. For each sub-block (i.e. each subset), the significance map, which is represented by significant coefficient flags significant_coeff_flag[x,y], is coded first. Variable x is the horizontal position of the coefficient within the sub-block and the value of x is from 0 to (sub-block width−1). Variable y is the vertical position of the coefficient within the sub-block and the value of y is from 0 to (sub-block height−1). The flag, significant_coeff_flag[x,y] indicates whether the corresponding coefficient of the TU is zero or non-zero. For convenience, the index [x,y] is omitted from significant_coeff_flag[x,y]. For each non-zero coefficient as indicated by significant_coeff_flag, the level and sign of the non-zero coefficient is represented by coeff_abs_level_greater1_flag, coeff_abs_level_greater2_flag, coeff_abs_level_minus3, and coeff_sign_flag.

In HM-5.0, if the TU size is equal to 16×16, 32×32, 16×4, 4×16, 32×8, or 8×32, one significant_coeffgroup_flag is coded for each sub-block prior to the coding of significant_coeff_flag and level and sign of the sub-block (e.g. coeff_abs_level_greater1_flag, coeff_abs_level_greater2_flag, coeff_abs_level_minus3, and coeff_sign_flag). If significant_coeffgroup_flag is equal to 0, it indicates that the entire 4×4 sub-block is zero. Therefore, there is no need for any additional information to represent this sub-block. Accordingly, the coding of level and sign of sub-block can be skipped. If significant_coeffgroup_flag is equal to 1, it indicates that at least one coefficient in the 4×4 sub-block is non-zero. The level and sign of each non-zero coefficient in the sub-block will be coded after the significant_coeffgroup_flag. The value of significant_coeffgroup_flag is inferred as 1 for the sub-block containing the DC term (i.e., the transform coefficient with the lowest spatial frequency).

In HM-5.0, significant_coeff_flag is coded in regular CABAC mode with context modeling. Different context selection methods are used for different TU sizes. For TUs with size of 4×4 or 8×8, the context selection is based on the position of the coefficient within the TU. FIG. 3 shows the position-based context selection map for a 4×4 TU and FIG. 4 shows the position-based context selection map for an 8×8 TU as adopted in HM-5.0. In FIG. 3, significance map 310 is used for the luma component and significance map 320 is used for the chroma component, where each number corresponds to a context selection. In FIG. 4, luma and chroma 8×8 TUs share the same significance map.

For other TU sizes, the neighboring-information-dependent context selection is adopted. FIGS. 5A and 5B illustrate examples of the neighboring-information-dependent context selection for luma and chroma components respectively.

One context is used for the DC coefficient. For non-DC coefficients (i.e., AC coefficients), the context selection depends on the neighboring coefficients. For example, a group of neighboring non-zero coefficients including I, H, F, E, and B around a current coefficient X are used for the context selection. If none of the neighboring pixels is non-zero, context #0 is used for coefficient X. If one or two of the neighboring pixels are non-zero, context #1 is used for X. Otherwise context #2 is used for coefficient X.

In the above neighboring-information-dependent context selection, the entire TU is divided into two regions (i.e., region-1 and region-2) for the luma component and one region (region-2) for the chroma component. Different regions will use different context sets. Each context set includes three contexts (i.e., context #0, #1, and #2). The area of region-1 for the luma component can be mathematically specified by the x-position and y-position of a coefficient X within the TU. As shown in FIG. 5A, if the sum of x-position and y-position of coefficient X is smaller than a threshold value and greater than 0, region-1 context set is selected for coefficient X. Otherwise, region-2 context set is selected. The threshold value can be determined based on the width and the height of the TU. For example, the threshold can be set to a quarter of the maximum value of the TU width and the TU height. Accordingly, in the case of TU sizes 32×32, 32×8 or 8×32, the threshold value can be set to 8.

When position-based context selection method is used for 4×4 and 8×8 TUs, look-up tables will be needed to store the context selection map for each coefficient position. In HM-5.0, three look-up tables have to be stored, i.e. one for 4×4 luma TUs, one for 4×4 chroma TUs and one for both 8×8 luma and chroma TUs, as shown in FIG. 3 and FIG. 4, respectively. For hardware-based implementation, the context selection tables for significance map coding can be implemented using look-up tables or logic circuits. It is desirable to keep the number of context selection tables as small as possible to reduce system cost associated with memory or logic circuits for the context selection tables.

SUMMARY

A method and apparatus for significance map coding of 4×4 TUs (transform units) and 8×8 TUs of video data using context selection tables are disclosed. The method comprises receiving at least one context selection table for a first TU associated with a first color component and generating a derived context selection table for a second TU associated with a second color component from said at least one context selection table. The first TU has a first size selected from a group consisting of 4×4 and 8×8. The second TU has a second size selected from the group consisting of 4×4 and 8×8. The second size is different from the first size, the second color component is different from the first color component, or both the second size is different from the first size and the second color component is different from the first color component. The derived context selection table is then used for significance map processing of the second TU.

In one embodiment, a position-based context selection table for the 4×4 TU associated with the luma component is used to generate the derived context selection table for the 4×4 TU associated with the chroma component, or for the 8×8 TU associated with the luma component or the chroma component. The derived context selection table for the 8×8 TU associated with the luma component or the chroma component can be generated by 2:1 down-scaling horizontal index and vertical index of the derived context selection table to form a down-scaled horizontal index and a down-scaled vertical index first. The table entry at the horizontal index and the vertical index of the derived context selection table is then assigned according to the table entry at the down-scaled horizontal index and the down-scaled vertical index of the position-based context selection table. Alternatively, the derived context selection table for the 8×8 TU associated with the luma component or the chroma component can be generated by 1:2 up-scaling the position-based context selection table horizontally and vertically, and repeating each existing table entry horizontally and vertically into 2×2 table entries to fill the derived context selection table.

In another embodiment of the present invention, a position-based context selection table for an 8×8 TU associated with the luma component is used to generate the derived context selection table for a 4×4 TU associated with the luma component or a 4×4 TU associated with the chroma component, or an 8×8 TU associated with the chroma component. The derived context selection table for a 4×4 TU associated with the luma component or a 4×4 TU associated with the chroma component can be generated by 2:1 down-scaling the position-based context selection table horizontally and vertically.

BRIEF DESCRIPTION OF DRAWINGS

FIG. 3 illustrates context selection maps for the 4×4 luma TU and the 4×4 chroma TU used by HEVC Test Model Version 5.0.

FIG. 4 illustrates the context selection map for the 8×8 luma TU and the 8×8 chroma TU used by HEVC Test Model Version 5.0.

FIG. 8B illustrates an example of deriving the context selection table for the 8×8 chroma TU based on a position-based context selection table for the 8×8 luma TU according to an embodiment of the present invention.

DETAILED DESCRIPTION

As mentioned earlier, the context selection tables for significance map coding can be implemented using look-up tables or logic circuits for hardware-based implementation. In order to reduce system cost associated with look-up tables and/or more logic circuits, embodiments of the present invention share context selection table among 4×4 luma, 4×4 chroma, 8×8 luma and 8×8 chroma components.

Figure 1:
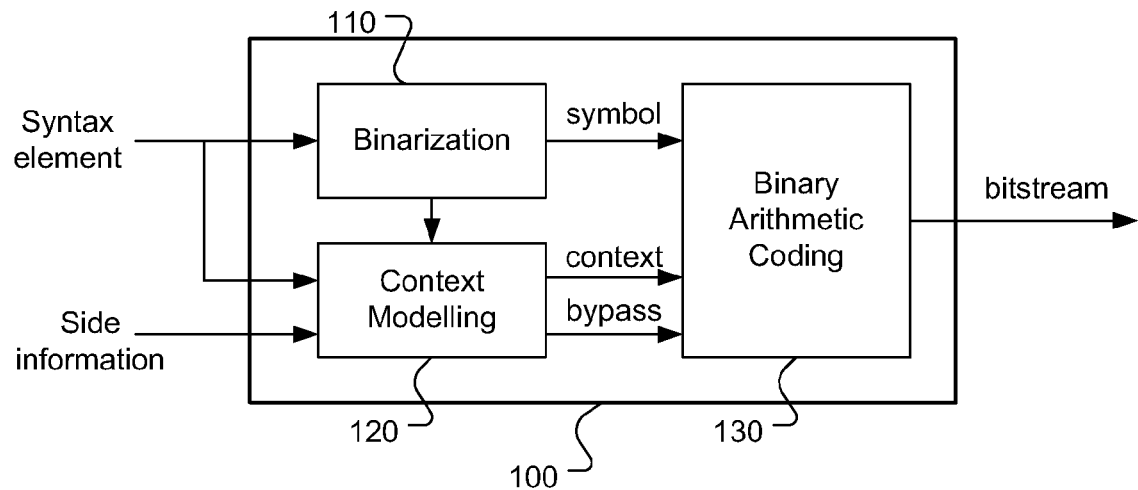
FIG. 1 illustrates an exemplary architecture of CABAC encoding system with a bypass mode.
Figure 2:
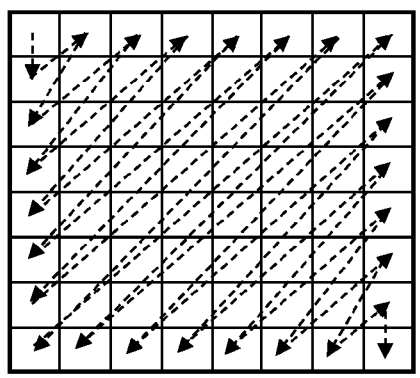
FIG. 2 illustrates an exemplary diagonal scanning order for the transform coefficients of an 8×8 TU.
Figure 5A:
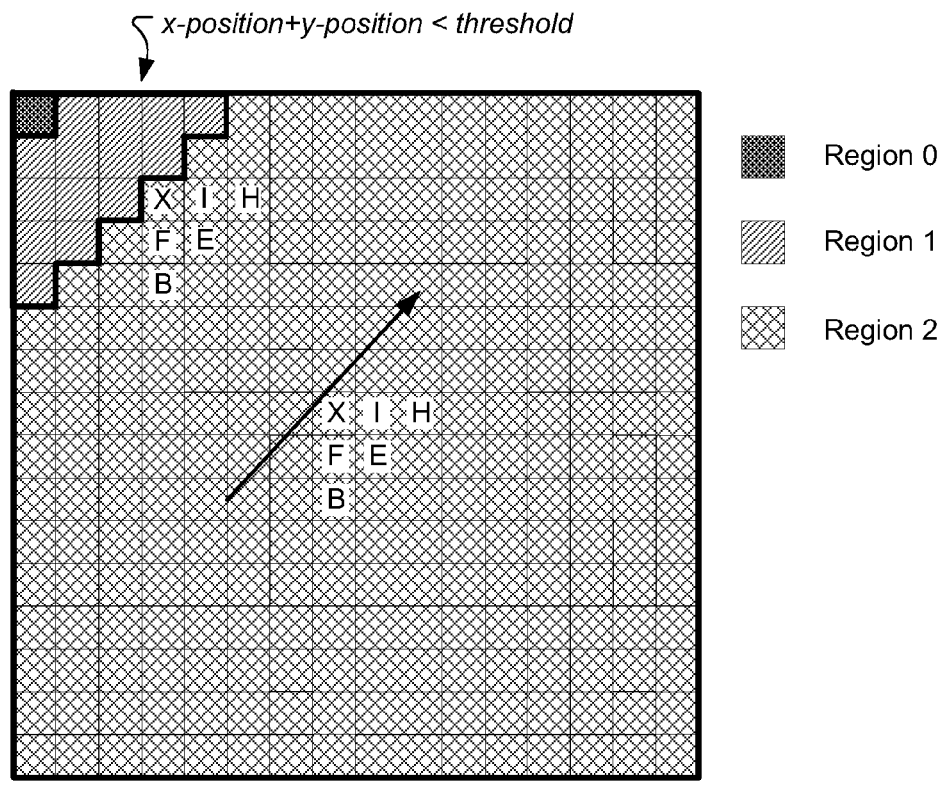
FIG. 5A illustrates the neighboring-information-dependent context selection for the 16×16 luma TU used by HEVC Test Model Version 5.0.
Figure 5B:
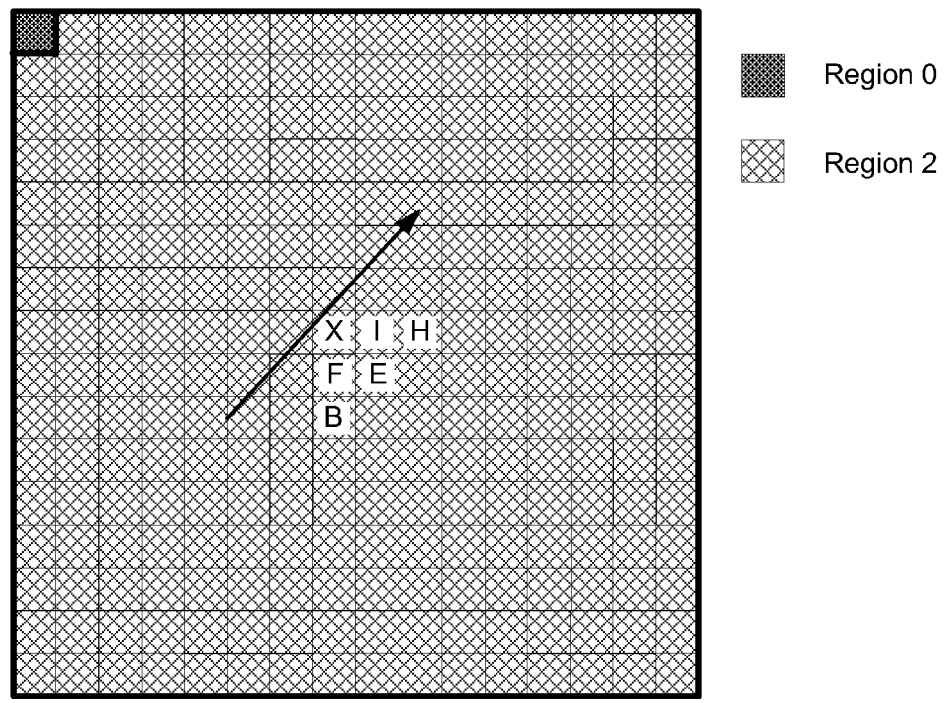
FIG. 5B illustrates the neighboring-information-dependent context selection for the 16×16 chroma TU used by HEVC Test Model Version 5.0.
Figure 6A:
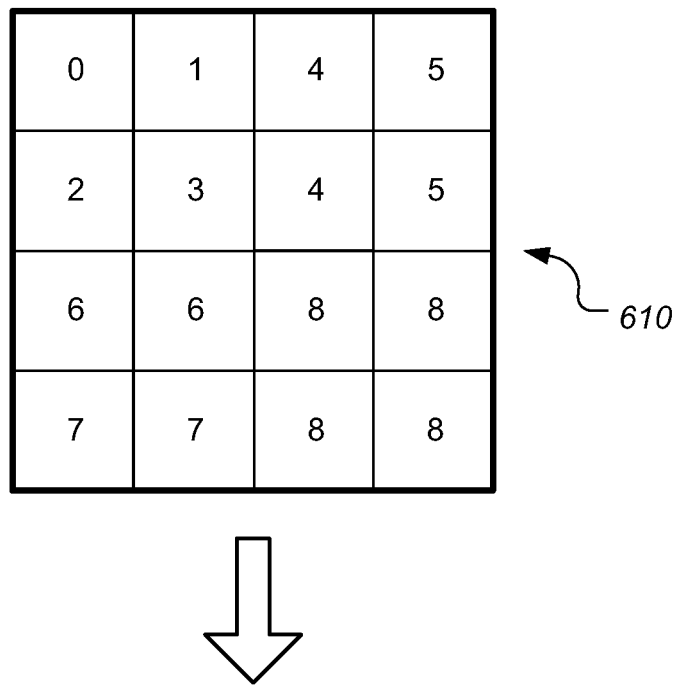
FIG. 6A illustrates an example of deriving the context selection table for the 8×8 luma TU based on a position-based context selection table for the 4×4 luma TU according to an embodiment of the present invention.

In the first embodiment, the context selection table for significance map coding of the 4×4 luma TU is shared by both 8×8 luma and chroma TUs. For each 8×8 luma or chroma TU, the table entry of the context selection table at a position is derived first by 2:1 down-scaling the horizontal index and the vertical index associated with the position horizontally and vertically to obtain the down-scaled indices of the position. The context selection table for significance map coding of the 8×8 luma or chroma component at the position is then determined from the look-up table for the 4×4 luma context selection table at the down-scaled indices of the position. For example, for positions at (0,0), (1,0), (0,1) and (1,1) of the context selection table for the 8×8 TUs, all the down-scaled indices will be (0,0) and for positions at (4,2), (5,2), (4,3) and (5,3) of the context selection table for the 8×8 TUs, all the down-scaled indices will be (2,1). The context selection table for the 8×8 luma or chroma TU is then generated from the 4×4 luma context selection table. Therefore, there is no need to store the context selection table for significance map coding of the 8×8 luma and chroma TUs. The unified context selection look-up tables for the 4×4 luma TUs and the 8×8 luma and chroma TUs is shown in FIG. 6A. A position-based context selection table 610 for the 4×4 luma TU is used to generate the derived context selection table 620 for 8×8 luma and chroma TUs. The DC term of the 8×8 TUs of the luma or chroma component may use its own context.

Figure 6B:
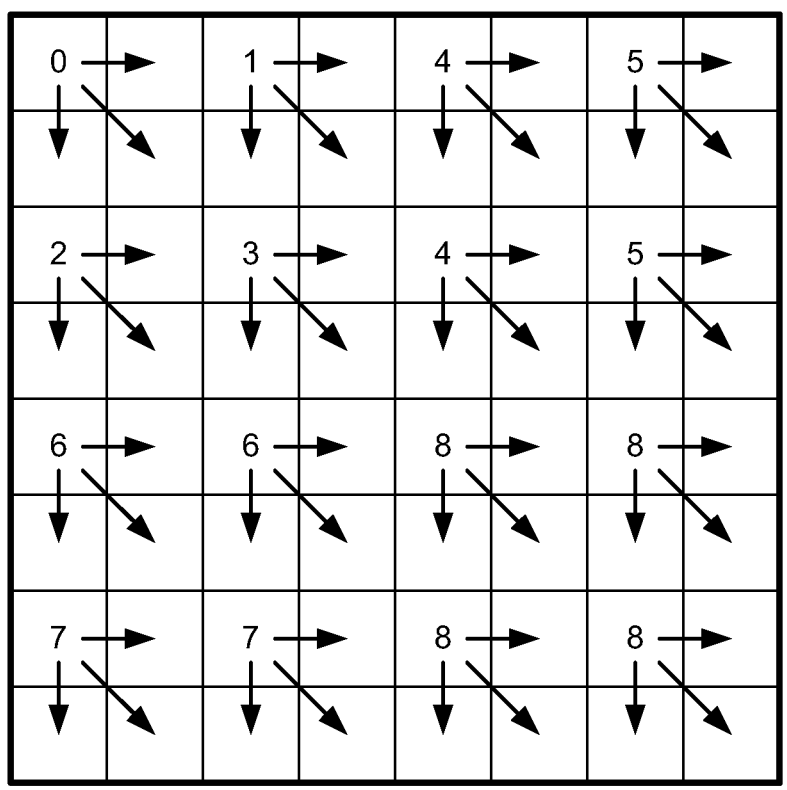
FIG. 6B illustrates an example of deriving the context selection table for the 8×8 luma TU based on a position-based context selection table for the 4×4 luma TU using up-scaling and repeating according to an embodiment of the present invention.

While the context selection table derivation described above uses horizontal index and vertical index down-scaling method, the context selection table derivation may also be achieved by up-scaling the context selection table for the 4×4 TU. FIG. 6B illustrates an example of context selection table derivation based on up-scaling. The context selection table for the 4×4 TU is up-scaled by a factor of 2 to form an 8×8 table as shown in FIG. 6B, where table entry (2i,2j) of the 8×8 table assumes the value from table entry (i,j) of the 4×4 table. Table entries for other positions are generated by repeating the existing table entries horizontally, vertically and diagonally as indicated by arrows in the horizontal, vertical and diagonal directions associated with each existing table entry. Therefore, 2×2 table entries are generated from each existing table entry to fill the entire 8×8 table. In this embodiment, the 4×4 chroma TUs uses its own context selection table. Accordingly, a system incorporating this embodiment requires storing information of the context selection table for the 4×4 luma TUs and the information of the context selection table for the 4×4 chroma TUs. The 8×8 luma and chroma TUs share the same context selection table derived from the context selection table for the 4×4 luma TUs.

Figure 7:
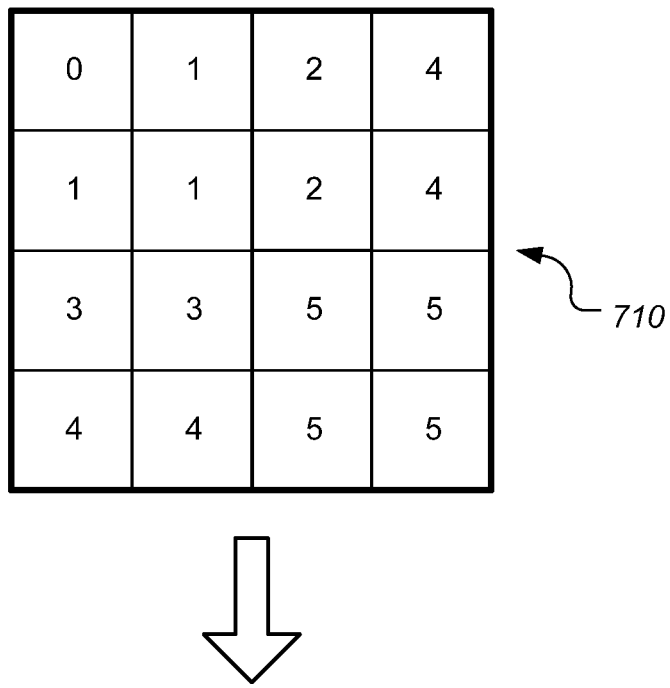
FIG. 7 illustrates an example of deriving the context selection table for the 8×8 chroma TU based on a position-based context selection table for the 4×4 chroma TU according to an embodiment of the present invention.

In the second embodiment, the context selection table for the 4×4 luma TUs is shared by the 8×8 luma TUs and the context selection table for the 4×4 chroma TUs is shared by the 8×8 chroma TUs. The 8×8 context selection table derivation from the context selection table for 4×4 TU is similar to the method described in the first embodiment. The 8×8 context selection table derivation from the 4×4 context selection table can be based on 2:1 down-scaling method or 1:2 up-scaling method as described in the first embodiment. The context selection table for the 8×8 luma TU is derived from the context selection table for the 4×4 luma TU. The context selection table for the 8×8 chroma TU is derived from the context selection table for the 4×4 chroma TU. Therefore, there is no need to store the information regarding the context selection tables for the luma and chroma 8×8 TUs. The DC term of the 8×8 luma or chroma TU may use its own context. The unified context selection tables for the 4×4 and 8×8 TUs of the luma component may be the same as the tables shown in FIG. 6A. The unified context selection tables for the 4×4 and 8×8 TUs of the chroma component are shown in FIG. 7, where a position-based context selection table 710 is used to generate a derived context selection table 720 for the 8×8 chroma TU. Accordingly, a system incorporating this embodiment requires storing information of the context selection table for 4×4 luma TUs and the information of the context selection table for 4×4 chroma TUs. The 8×8 luma and chroma TUs use separate context selection tables which are derived from the context selection tables for 4×4 luma TUs and 4×4 chroma TUs respectively.

In the third embodiment, the context selection table for the 4×4 luma TU is shared by the 8×8 luma and chroma TUs as well as by the 4×4 chroma TU. The sharing of the context selection table by the 4×4 luma TUs and the 8×8 luma and chroma TUs has already been described in the first embodiment of the present invention. In the third embodiment, the context selection table for the 4×4 luma TU is further shared by the 4×4 chroma TU. The DC term of the 8×8 TUs of the luma or chroma component may use an individual context. Accordingly, a system incorporating this embodiment requires storing information of the context selection table for 4×4 luma TU only. The context selection tables for the 4×4 chroma TU and the 8×8 luma and chroma TUs are all derived from the context selection tables for the 4×4 luma TU. The 8×8 context selection table derivation based on a 4×4 context selection table has been described in the first embodiment. The context selection table for the 4×4 chroma TU is the same as the context selection table 610 for the 4×4 luma TU as shown in FIG. 6A.

In the first, second and third embodiments, the table entry of the context selection table for DC term of the 8×8 TUs for luma and/or chroma components may have its own context. However, the table entry of the context selection table for DC term of the 8×8 TUs may also reuse the DC term of the 4×4 context selection table. For example, the upper left 2×2, i.e., four coefficients (marked as 0 in table 620 of FIG. 6A and table 720 of FIG. 7) can share the same context.

Figure 8A:
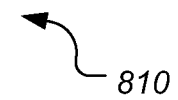
FIG. 8A illustrates an example of deriving the context selection table for the 4×4 luma TU based on a position-based context selection table for the 8×8 luma TU according to an embodiment of the present invention.
Figure 8A:
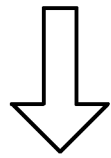
Figure 8A:
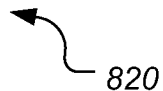

In the fourth embodiment, the context selection table for significance map coding of the 8×8 luma TU is shared by the 4×4 luma and chroma TUs as well as by the 8×8 chroma TU. The sharing of the context selection table by the 8×8 luma TUs and the 4×4 luma and chroma TUs can be achieved by down-sampling the context selection table for the 8×8 luma TU. For example, a position-based context selection table 810 for the 8×8 luma TU is 2:1 down-sampled to form a 4×4 derived context selection table for the 4×4 luma and chroma TUs as shown in FIG. 8A. In this example, the table entry of the derived context selection table 820 for the DC term of the 4×4 luma and chroma TUs uses context #0 instead of the individual context (i.e., #10) of the DC term of the 8×8 luma TU in FIG. 8A. The derived context selection table for the 8×8 chroma TUs, as shown in FIG. 8B, is the same as the position-based context selection table for the 8×8 luma TU except for the DC term. As shown in FIG. 8B, the upper left four table entries (including the DC term) of the derived context selection table for the 8×8 chroma TU use the same context, i.e., #0. Accordingly, a system incorporating this embodiment requires storing information of the context selection table for the 8×8 luma TU only.

In the fifth embodiment, the context selection table for significance map coding of a 4×4 luma TU is designed to have the same pattern as table 610 shown in FIG. 6A. Each entry of the context selection table for the 4×4 TU defines a context used by significant coefficient flag (significant_coeff_flag[x,y]) at position (x,y), where x indicates the horizontal position within the 4×4 TU and y indicates the vertical position within the 4×4 TU. By using the context selection table for performing significance map coding, significant coefficient flag at position (0,0) uses context number 0, significant coefficient flag at position (1,0) uses context number 1, significant coefficient flag at position (0,1) uses context number 2, significant coefficient flag at position (1,1) uses context number 3, significant coefficient flag at positions (2,0) or (2,1) uses context number 4, significant coefficient flag at positions (3,0) or (3,1) uses context number 5, significant coefficient flag at positions (0,2) or (1,2) uses context number 6, significant coefficient flag at positions (0,3) or (1,3) uses context number 7, and significant coefficient flag at positions (2,2), (3,2), (2,3), or (3,3) uses context number 8. In other words, the significant coefficient at a position belonging to the position set {(0,0), (1,0), (2,0), (3,0), (0,1), (1,1), (2,1), (3,1), (0,2), (1,2), (2,2), (3,2), (0,3), (1,3), (2,3), (3,3)} will use a respective context belonging to the context set {0,1,4,5,2,3,4,5,6,6,8,8,7,7,8,8}. In one embodiment, the context selection table is shared between 4×4 TUs associated with the luma component and 4×4 TUs associated with the chroma component.

In the above examples, specific position-based context selection tables for the 4×4 luma TU and the 8×8 luma TU are used to illustrate context selection table sharing in various embodiments. The specific context selection tables shall not be construed as limitations to the present invention. A person skilled in the art may practice the present invention by using other context selection tables to generate a derived context selection table for a TU with a select size and color component. Furthermore, while 2:1 down-scaling and/or 1:2 up-scaling can be used to generate the derived context selection tables for the 8×8 TU and the 4×4 TU, other means to generated the derived context selection tables for the 8×8 TU and the 4×4 TU may also be used to practice the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of significance map coding for TUs (transform units) of video data using context selection tables, the method comprising:
receiving at least one context selection table for a first TU associated with a first color component, wherein the first TU has a first size selected from a group consisting of 4×4 and 8×8;
determining entries of a second context selection table for a second TU associated with a second color component from said at least one context selection table, wherein the second TU has a second size selected from the group consisting of 4×4 and 8×8, wherein the second size is different from the first size, the second color component is different from the first color component, or both the second size is different from the first size and the second color component is different from the first color component; and
providing the second context selection table for significance map coding processing of the second TU,
wherein said determining the entries of the second context selection table for the second TU comprises one of:
sharing entries of said at least one context selection table with the first TU; or
scaling said at least one context selection table to generate the entries of the second context selection table for the second TU.

2. The method of claim 1, wherein a position-based context selection table for a 4×4 TU associated with the luma component is received, and a 4×4 TU associated with the chroma component uses the position-based context selection table for the 4×4 TU associated with the luma component as the second context selection table.

3. The method of claim 1, wherein a position-based context selection table for a 4×4 TU associated with the luma component is received, and the second context selection table for an 8×8 TU associated with the luma component or an 8×8 TU associated with the chroma component is generated from the position-based context selection table for the 4×4 TU associated with the luma component.

4. The method of claim 3, wherein the second context selection table is generated by 2:1 down-scaling horizontal index and vertical index of the second context selection table to form a down-scaled horizontal index and a down-scaled vertical index, and assigning a first table entry at the horizontal index and the vertical index of the second context selection table according to a second table entry at the down-scaled horizontal index and the down-scaled vertical index of the position-based context selection table.

5. The method of claim 3, wherein the second context selection table is generated by 1:2 up-scaling the position-based context selection table horizontally and vertically, and repeating each existing table entry horizontally, vertically and diagonally into 2×2 table entries to fill the second context selection table.

6. The method of claim 3, wherein a first table entry corresponding to DC term of the second context selection table shares a second table entry corresponding to DC term of the position-based context selection table or uses an individual table entry.

7. The method of claim 3, wherein upper-left 2×2 table entries of the second context selection table shares a table entry corresponding to DC term of the position-based context selection table or uses an individual table entry.

8. The method of claim 1, wherein a position-based context selection table for an 8×8 TU associated with the luma component is received, and the second context selection table for a 4×4 TU associated with the luma component or a 4×4 TU associated with the chroma component is generated from the position-based context selection table.

9. The method of claim 8, wherein the second context selection table is generated by 2:1 down-scaling the position-based context selection table horizontally and vertically.

10. The method of claim 1, wherein a position-based context selection table for an 8×8 TU associated with the luma component is received, and an 8×8 TU associated with the chroma component uses the position-based context selection table as the derived second context selection table.

11. An apparatus of significance map coding for TUs (transform units) of video data using context selection tables, the apparatus comprising:
at least one circuit, the at least one circuit being configured for:
receiving at least one context selection table for a first TU associated with a first color component, wherein the first TU has a first size selected from a group consisting of 4×4 and 8×8;
determining entries of a second context selection table for a second TU associated with a second color component from said at least one context selection table, wherein the second TU has a second size selected from the group consisting of 4×4 and 8×8, wherein the second size is different from the first size, the second color component is different from the first color component, or both the second size is different from the first size and the second color component is different from the first color component; and
providing the second context selection table for significance map coding processing of the second TU,
wherein said determining the entries of the second context selection table for the second TU comprises one of:
sharing entries of said at least one context selection table with the first TU; or
scaling said at least one context selection table to generate the entries of the second context selection table for the second TU.

12. The apparatus of claim 11, wherein a position-based context selection table for a 4×4 TU associated with the luma component is received, and a 4×4 TU associated with the chroma component uses the position-based context selection table for the 4×4 TU associated with the luma component as the second context selection table.

13. The apparatus of claim 11, wherein a position-based context selection table for a 4×4 TU associated with the luma component is received, and the second context selection table for an 8×8 TU associated with the luma component or an 8×8 TU associated with the chroma component is generated from the position-based context selection table for the 4×4 TU associated with the luma component.

14. The apparatus of claim 13, wherein the second context selection table is generated by 2:1 down-scaling horizontal index and vertical index of the second context selection table to form a down-scaled horizontal index and a down-scaled vertical index, and assigning a first table entry at the horizontal index and the vertical index of the second context selection table according to a second table entry at the down-scaled horizontal index and the down-scaled vertical index of the position-based context selection table.

15. The apparatus of claim 13, wherein the second context selection table is generated by 1:2 up-scaling the position-based context selection table horizontally and vertically, and repeating each existing table entry horizontally, vertically and diagonally into 2×2 table entries to fill the second context selection table.

16. The apparatus of claim 13, wherein a first table entry corresponding to DC term of the second context selection table shares a second table entry corresponding to DC term of the position-based context selection table or uses an individual table entry.

17. The apparatus of claim 13, wherein upper-left 2×2 table entries of the second context selection table shares a table entry corresponding to DC term of the position-based context selection table or uses an individual table entry.

18. The apparatus of claim 11, wherein a position-based context selection table for an 8×8 TU associated with the luma component is received, and the second context selection table for a 4×4 TU associated with the luma component or a 4×4 TU associated with the chroma component is generated from the position-based context selection table.

19. The apparatus of claim 18, wherein the second context selection table is generated by 2:1 down-scaling the position-based context selection table horizontally and vertically.

20. The apparatus of claim 11, wherein a position-based context selection table for an 8×8 TU associated with the luma component is received, and an 8×8 TU associated with the chroma component uses the position-based context selection table as the second context selection table.

21. A method of significance map coding for 4×4 TUs (transform units) of video data using context selection tables, the method comprising:
receiving a context selection table for a 4×4 TU;
performing significance map coding processing on the 4×4 TU using the context selection table;
wherein each entry of the context selection table for the 4×4 TU defines a context used by significant coefficient flag at position (x,y), where x indicates the horizontal position within the 4×4 TU and y indicates the vertical position within the 4×4 TU; and
wherein the significant coefficient flag at a given position belonging to a position set {(0,0),(1,0),(2,0),(3,0),(0,1), (1,1),(2,1),(3,1),(0,2),(1,2),(2,2),(3,2),(0,3),(1,3),(2,3), (3,3)} uses a respective context belonging to a context set {0,1,4,5,2,3,4,5,6,6,8,8,7,7,8,8}.

22. The method of claim 21, wherein the context selection table is for 4×4 TUs associated with luma component.

23. The method of claim 21, wherein the context selection table is for 4×4 TUs associated with chroma component.

* * * * *